(12) United States Patent
Ran et al.

(10) Patent No.: US 12,279,191 B2
(45) Date of Patent: Apr. 15, 2025

(54) DEVICE ALLOCATION SYSTEM

(71) Applicant: CAVH LLC, Fitchburg, WI (US)

(72) Inventors: Bin Ran, Fitchburg, WI (US);
Shuoxuan Dong, Madison, WI (US);
Yang Cheng, Middleton, WI (US);
Tianyi Chen, Madison, WI (US); Shen Li, Madison, WI (US); Xiaotian Li, Madison, WI (US); Kunsong Shi, Madison, WI (US); Haotian Shi, Madison, WI (US); Keshu Wu, Madison, WI (US); Yifan Yao, Madison, WI (US); Ran Yi, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 309 days.

(21) Appl. No.: 17/192,441

(22) Filed: Mar. 4, 2021

(65) Prior Publication Data
US 2021/0314752 A1    Oct. 7, 2021

Related U.S. Application Data

(60) Provisional application No. 63/004,564, filed on Apr. 3, 2020.

(51) Int. Cl.
*H04W 4/44* (2018.01)
*G05D 1/00* (2024.01)
*H04W 72/51* (2023.01)

(52) U.S. Cl.
CPC .......... *H04W 4/44* (2018.02); *G05D 1/0088* (2013.01); *G05D 1/0276* (2013.01); *H04W 72/51* (2023.01)

(58) Field of Classification Search
CPC ...... H04W 72/51; H04W 4/44; G05D 1/0088; G05D 1/0276; G05D 2201/0213
See application file for complete search history.

(56) References Cited

U.S. PATENT DOCUMENTS

| 7,421,334 B2 | 9/2008 | Dahlgren et al. |
| 7,554,435 B2 | 6/2009 | Tengler et al. |
| 2009/0043486 A1* | 2/2009 | Yang ................. G01C 21/3492 701/117 |

(Continued)

FOREIGN PATENT DOCUMENTS

JP    2018106438 A    *    7/2018

OTHER PUBLICATIONS

Baskar, Schutter, Hellendoorn, "Model-Based Predictive Traffic Control for Intelligent Vehicles: Dynamic Speed Limits and Dynamic Lane Allocation", Jun. 3-6, 2008, IEEE Intelligent Vehicles Symposium, p. 1-6 (Year: 2008).*

(Continued)

*Primary Examiner* — Kenny S Lin
*Assistant Examiner* — Rodrick Mak
(74) *Attorney, Agent, or Firm* — Casimir Jones, S.C.; Thomas A. Isenbarger

(57) ABSTRACT

Provided herein is technology relating to aspects of a Distributed Driving System (DDS) for managing Connected and Automated Vehicles (CAV) and particularly, but not exclusively, to systems, designs, and methods for a Device Allocation System (DAS) configured to allocate and distribute resources to devices of a Distributed Driving Systems (DDS).

18 Claims, 9 Drawing Sheets
(6 of 9 Drawing Sheet(s) Filed in Color)

(56) References Cited

U.S. PATENT DOCUMENTS

| | | | |
|---|---|---|---|
| 2015/0029987 A1* | 1/2015 | Addepalli | H04W 40/20 |
| | | | 370/329 |
| 2018/0336780 A1 | 11/2018 | Ran et al. | |
| 2018/0349714 A1* | 12/2018 | Sakamoto | G06V 10/56 |
| 2019/0049948 A1* | 2/2019 | Patel | G05D 1/0276 |
| 2019/0096238 A1 | 3/2019 | Ran et al. | |
| 2019/0171208 A1* | 6/2019 | Magalhães de Matos | |
| | | | G05D 1/0027 |
| 2019/0244521 A1 | 8/2019 | Ran et al. | |
| 2020/0005633 A1 | 1/2020 | Jin et al. | |
| 2020/0021961 A1 | 1/2020 | Li et al. | |
| 2021/0065547 A1 | 3/2021 | Ran et al. | |
| 2021/0311491 A1 | 10/2021 | Li et al. | |

OTHER PUBLICATIONS

SAE International Standard J3016. Jan. 2014. 12 pages.
SAE International Standard J3016_Sep. 2016. Sep. 2016. 30 pages.

* cited by examiner

DEVICE ALLOCATION SYSTEM

This application claims priority to U.S. provisional patent application Ser. No. 63/004,564, filed Apr. 3, 2020, which is incorporated herein by reference in its entirety.

FIELD

Provided herein is technology relating to a Device Allocation System (DAS) and particularly, but not exclusively, to systems, designs, and methods for a DAS configured to allocate, arrange, and distribute resources to devices of a Distributed Driving Systems (DDS). The DAS supports and facilitates management of vehicle operation and control by the DDS and thus assists in maximizing the general safety of individual vehicles and vehicle fleets and improves and/or maximizes DDS system objectives of efficiency, intelligence, reliability, and resilience.

BACKGROUND

Connected and Automated Vehicles (CAVs), which are capable of sensing the environment, detecting obstacles, and navigating without human effort, are presently in development. While some CAVs are currently being evaluated in field testing, CAVs are not widely available on the commercial market or in widespread use. Existing CAV technologies implement and/or require expensive and complicated onboard systems, multiple sensing systems, and rely extensively and/or exclusively on sensing and control provided by individual vehicles. Accordingly, present CAVs consume large amounts of power for sensing and vehicle control, which limits the driving range of CAVs and the amount of resources for other CAV functions.

SUMMARY

Some technologies that address these problems are provided by a Distributed Driving System (DDS) as described in U.S. Pat. App. Ser. No. 62/894,703 (incorporated herein by reference in its entirety) and/or an Intelligent Roadside Toolbox (IRT) as described in U.S. Pat. App. Ser. No. 63/004,551 (incorporated herein by reference in its entirety). In some embodiments, the Device Allocation System (DAS) technology described herein provides systems and methods for allocating, distributing, and/or arranging resources among IRT and CAV devices (e.g., components, modules, units, systems, and/or subsystems of an IRT and/or components, modules, units, systems, and/or subsystems of CAVs) to achieve (e.g., optimize) objectives of the DDS system. For example, in some embodiments, the technology allocates resources among IRT and CAV devices to maximize reliability, intelligence level, efficiency, and/or resilience of the DDS (e.g., to provide optimized and robust vehicle operations, control, and automation). Accordingly, embodiments of the technology described herein provide a DAS for a DDS and resource allocation methods for supporting DDS objectives.

Accordingly, in some embodiments, the technology provides a Device Allocation System (DAS) configured to allocate resources among Intelligent Roadside Toolbox (IRT) devices and Connected and Automated Vehicle (CAV) devices. In some embodiments, resources comprise intelligence, automated driving functions, communications capacity, and/or power. In some embodiments, the DAS is provided as a subsystem of a Distributed Driving System (DDS).

In some embodiments, said IRT devices are physical and/or virtual. In some embodiments, said CAV devices are physical and/or virtual. In some embodiments, said IRT devices and/or CAV devices comprise hardware and/or software resources used by CAV and IRT. In some embodiments, IRT devices comprise Roadside Units (RSU). In some embodiments, IRT devices comprise a component of Connected and Automated Vehicle Highway (CAVH) System infrastructure. In some embodiments, IRT devices comprise a component of Intelligent Roadside Infrastructure System (IRIS) infrastructure. In some embodiments, CAV devices comprise a Vehicle Control Unit (VCU) or Onboard Unit (OBU). In some embodiments, said IRT devices and/or CAV devices support and/or provide automated driving functions of CAV. In some embodiments, said automated driving functions of CAV comprise sensing functions, transportation behavior prediction and management functions, planning and decision-making functions, and/or vehicle control functions. In some embodiments, vehicle control functions provide vehicle control instructions and/or information. In some embodiments, vehicle control instructions comprise customized, detailed, and time-sensitive control instructions for an individual vehicle. In some embodiments, said IRT devices and/or CAV devices comprise hardware and/or software for communication.

In some embodiments, the DAS is configured to improve DDS safety and efficiency. In some embodiments, the DAS is configured to provide and/or improve intelligence, efficiency, reliability, and/or resilience of DDS. In some embodiments, the DAS is configured to communicate with an automated vehicle services provider (e.g., automaker, communication company, and/or technology company). In some embodiments, the DAS is configured to optimize DDS reliability, DDS intelligence, DDS efficiency, and/or DDS resiliency. In some embodiments, the DDS provides intelligence for vehicles at an automated driving of Level 0, Level 1, Level 2, Level 3, and/or Level 4.

In some embodiments, the DAS is configured to allocate resources to IRT devices and CAV devices, wherein said resources provide sensing, transportation behavior prediction and management, planning and decision making, and/or vehicle control.

In some embodiments, the DAS comprises a component to produce a multi-objective optimization function to optimize system reliability, system intelligence, system efficiency, and system resilience. In some embodiments, the DAS is configured to perform methods to optimize profits for service providers. In some embodiments, the DAS is configured to perform methods to optimize benefits for individual users.

In some embodiments, the DAS is configured to manage CAV on roads with a partially instrumented DDS and/or partially instrumented IRT. In some embodiments, the DDS controls the automated driving of CAV. In some embodiments, the IRT coverage is provided at critical points on said roads. In some embodiments, the DDS manages the combined functionality of CAV and IRT to reach an appropriate system intelligence level for CAV control. In some embodiments, the DAS allocates resources to CAV and IRT to reach an appropriate system intelligence level for CAV control. In some embodiments, automated driving of CAV is provided by onboard devices of CAV when CAV exits IRT coverage areas.

In some embodiments, the DAS comprises a dynamic device allocation module configured to dynamically allocate resources to CAV and/or IRT devices based on time, location, IRT conditions, and environmental factors.

Also provided herein are methods employing any of the systems described herein for the management of one or more aspects of automated driving of a CAV. The methods include those processes undertaken by individual participants in the system (e.g., drivers; public or private local, regional, or national transportation facilitators; government agencies; service providers (e.g., automakers, communications providers, technology providers); etc.) and/or the collective activities of one or more participants working in coordination or independently from each other. For instance, in some embodiments, the technology provides a method for allocating resources of a DDS among devices of an IRT and/or a CAV. For example, in some embodiments, methods comprise providing a DAS, DDS, and/or an IRT system as described herein. In some embodiments, the technology provides a method for providing a virtual automated driving service to vehicles.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet, CAVH communications, cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings. The patent or application file contains at least one drawing executed in color. Copies of this patent or patent application publication with color drawings will be provided by the Office upon request and payment of the necessary fee.

Formulating Constraints; 704: Formulating Objective Function; 705: Choosing an Optimization Algorithm; 706: Outputting Result; 707: Maximum individual user benefits; 708: Variable x1: Effectiveness; 709: Variable x2: Intelligence; 710: Variable x3: Efficiency; 711: Variable x4: Reliability; 712: Variable Constraints.

Figure 8:
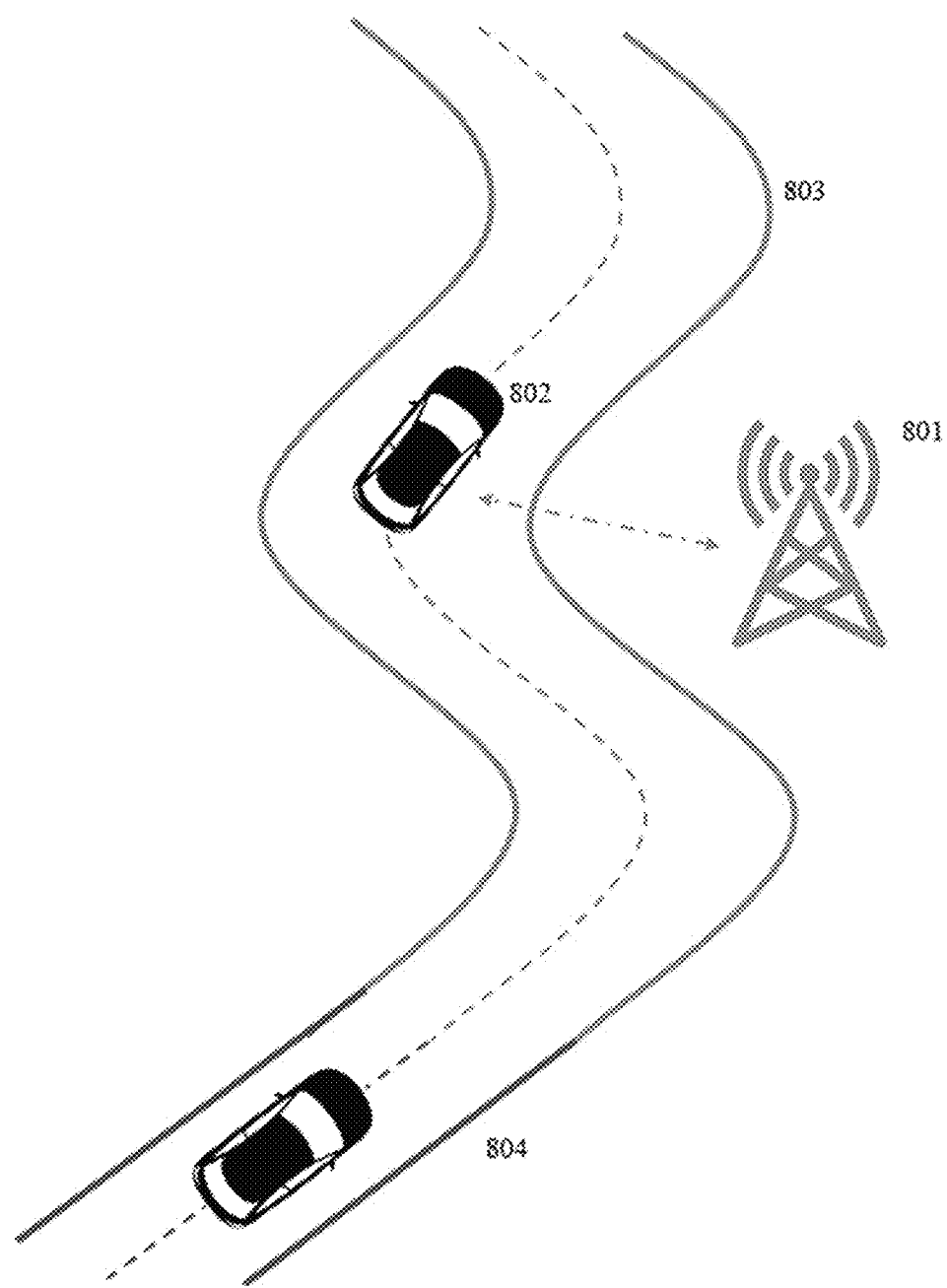

FIG. 8 is a schematic diagram showing a partially instrumented IRT on a critical point of a road. 801: Level 2 IRT; 802: Level 2 CAV; 803: IRT coverage area; 804: Normal highway.

Figure 9:
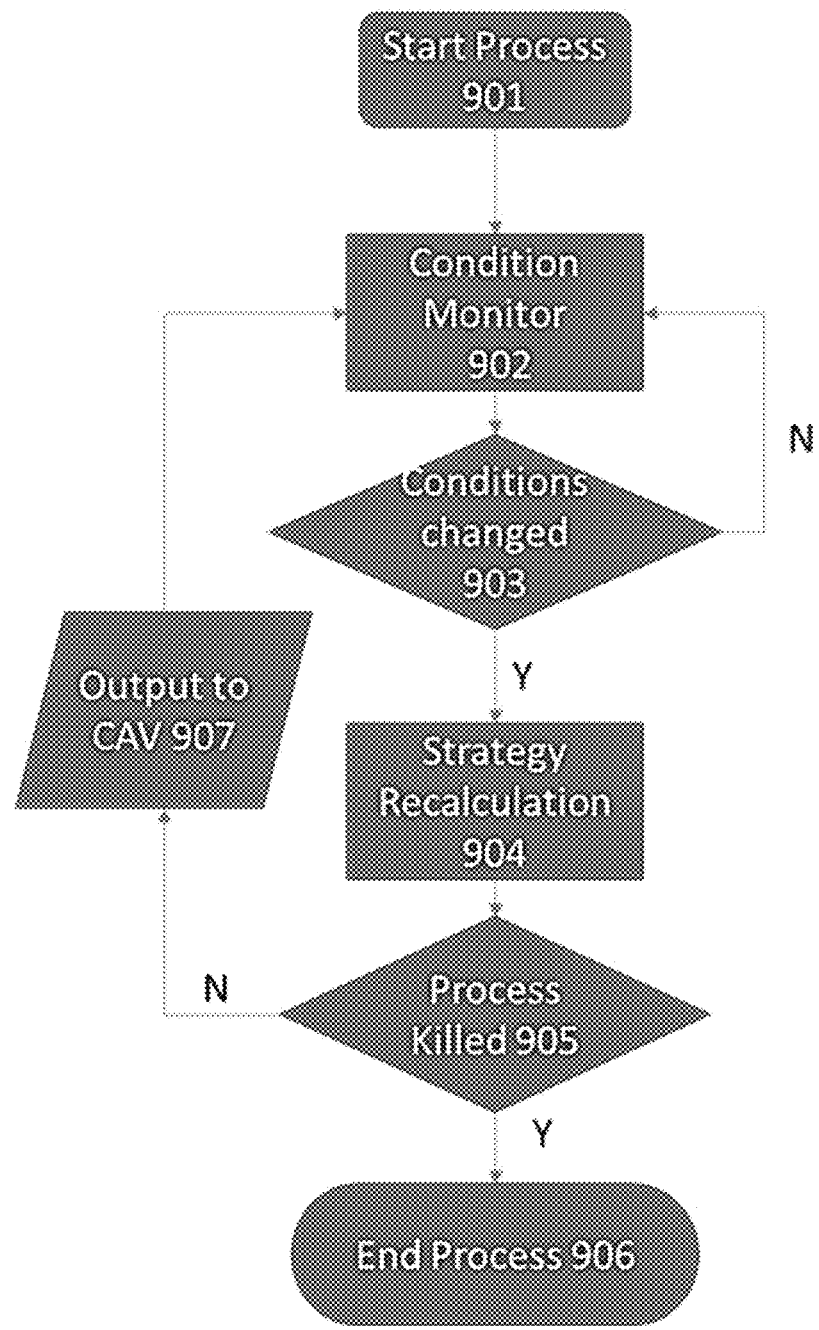

FIG. 9 is a flowchart describing processes provided by a dynamic device allocation subsystem. 901; Starting the dynamic device allocation process; 902: Monitoring the conditions; 903: Checking for a change in a condition; 904: Recalculating a strategy; 905: checking if the process is terminated; 906: Ending allocation process; 907: Outputting strategies to CAVs.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology providing a Device Allocation System (DAS) and particularly, but not exclusively, to systems, designs, and methods for a DAS configured to allocate and distribute resources to devices (e.g., CAV and/or IRT devices) of a Distributed Driving Systems (DDS). The DAS supports and facilitates management of vehicle operation and control by the DDS and thus assists in achieving and/or optimizing objectives of the DDS system (e.g., reliability, intelligence level, efficiency, and/or resilience of the DDS). Accordingly, the technology provided herein supports a DDS to provide optimized and robust vehicle operations, control, and automation; and, in some embodiments, improves and/or maximizes the general safety of individual vehicles and vehicle fleets.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "Connected Automated Vehicle Highway System" ("CAVH System") refers to a comprehensive system providing full vehicle operations and control for connected and automated vehicles (CAV), and, more particularly, to a system controlling CAVs by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: a) vehicle; b) roadside unit (RSU); c) traffic control unit (TCU); and d) traffic control center (TCC). See U.S. Pat. App. Pub. Nos. 20180336780, 20190244521, and/or 20190096238, each of which is incorporated herein by reference.

As used herein, the term "Intelligent Road Infrastructure System" ("IRIS") refers to a system that facilitates vehicle operations and control for CAVH systems. See U.S. Pat. App. Pub. Nos. 20190244521 and/or 20190096238, each of which is incorporated herein by reference.

As used herein, the term "support" when used in reference to one or more components of the DAS, ITS, DDS, IRIS, and/or CAVH system providing support to and/or supporting a vehicle (e.g., a CAV) and/or one or more other components of the DAS, ITS, DDS, IRIS, and/or CAVH system refers to, e.g., exchange of information and/or data between components and/or levels of the DAS, ITS, DDS, IRIS, CAVH system, and/or vehicle; sending and/or receiving instructions between components and/or levels of the DAS, ITS, DDS, IRIS, CAVH system, and/or vehicle; and/or other interaction between components and/or levels of the DAS, ITS, DDS, IRIS, CAVH system, and/or vehicle that provide functions such as information exchange, data transfer, messaging, and/or alerting.

As used herein, the term "autonomous vehicle" or "AV" refers to an autonomous vehicle, e.g., at any level of automation (e.g., as defined by SAE International Standard J3016 (2014), incorporated herein by reference).

As used herein, the term "allocate", "allocating", and similar terms referring to resource distribution also include distributing, arranging, providing, managing, assigning, controlling, and/or coordinating resources.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside units (RSUs), an IRT, traffic control signals, and other infrastructure (e.g., a DDS, IRIS, and/or CAVH system) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

In some embodiments, various spatial and temporal scales or levels are used herein, e.g., microscopic, mesoscopic, and macroscopic. As used herein, the "microscopic level" refers to a scale relevant to individual vehicles and movements of individual vehicles (e.g., longitudinal movements (car following, acceleration and deceleration, stopping and standing) and/or lateral movements (lane keeping, lane changing)). As used herein, the "mesoscopic level" refers to a scale relevant to road corridors and segments and movements of groups of vehicles (e.g., special event early notification, incident prediction, weaving section merging and diverging, platoon splitting and integrating, variable speed limit prediction and reaction, segment travel time prediction, and segment traffic flow prediction). As used herein, the term "macroscopic level" refers to a scale relevant for a road network (e.g., route planning, congestion, incidents, network traffic). As used herein, the term "microscopic level", when referring to a temporal scale, refers to a time of approximately 1 to 10 milliseconds (e.g., relevant to vehicle control instruction computation). As used herein, the term "mesoscopic level", when referring to a temporal scale, refers to a time of approximately 10 to 1000 milliseconds (e.g., relevant to incident detection and pavement condition notification). As used herein, the term "macroscopic level", when referring to a temporal scale, refers to a time that is approximately longer than 1 second (e.g., relevant to route computing).

As used herein, the term "automation level" or "automated driving level" refers to a level in a classification system describing the amount of driver intervention and/or attentiveness required for an AV, CV, and/or CAV. In particular, the term "automation level" refers to the levels of SAE International Standard J3016 (2014)) entitled "Taxonomy and Definitions for Terms Related to On-Road Motor Vehicle Automated Driving Systems" and updated in 2016 as J3016_201609, each of which is incorporated herein by reference. The SAE automation levels are briefly described as Level 0: "no automation" (e.g., a fully manual vehicle with all aspects of driving being human and manually controlled); Level 1: "driver assistance" (e.g., a single automated aspect such as steering, speed control, or braking control); Level 2: "partial automation" (e.g., human control with automated control of steering and acceleration/deceleration); Level 3: "conditional automation" (e.g., vehicles make informed decisions and human assumes control when the vehicle cannot execute a task); Level 4: "high automation" (e.g., vehicles make informed decisions and human is not required to assume control when the vehicle cannot execute a task); and Level 5: "full automation" (e.g., vehicles do not require human attention).

As used herein, the term "configured" refers to a component, module, system, sub-system, etc. (e.g., hardware and/or software) that is constructed and/or programmed to carry out the indicated function.

As used herein, the terms "determine", "calculate", "compute", and variations thereof, are used interchangeably to any type of methodology, processes, mathematical operation, or technique.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "intelligence level" refers to the automated driving level.

As used herein, the term "efficiency" refers to a vehicle driving range, e.g., the total driving range per charge for electric vehicles.

As used herein, the term "resilience" refers to the capability to restore system functions after a disturbance.

As used herein, the term "partially instrumented" refers to a system comprising some, but not all, IRT and/or DDS components and/or some, but not all, IRT and/or DDS functions (e.g., some, but not all of, sensing functions, transportation behavior prediction and management functions, planning and decision-making functions, and vehicle control functions).

As used herein, the term "critical point" refers to a portion or region of a road that is identified as appropriate to be provided with coverage by a DDS and/or IRT. In some embodiments, a critical point is identified based on road and/or traffic conditions that are generally constant or that change very slowly (e.g., on a time scale longer than a day, a week, or a month) or only by planned reconstruction of infrastructure (e.g., critical points based on historical crash data, traffic signs, traffic signals, traffic capacity, and/or road geometry). In some embodiments, a critical point is identified based on road conditions that change (e.g., predictably or not predictably) with time (e.g., on a time scale of an hour, a day, a week, or a month) (e.g., critical points based on traffic oscillations, real-time traffic management, or real-time traffic incidents).

Device Allocation System

The technology provided herein relates to a Device Allocation System (DAS) that manages and allocates resources to devices of an Intelligent Roadside Toolbox (IRT) and/or connected and automated vehicles (CAV).

Figure 1:
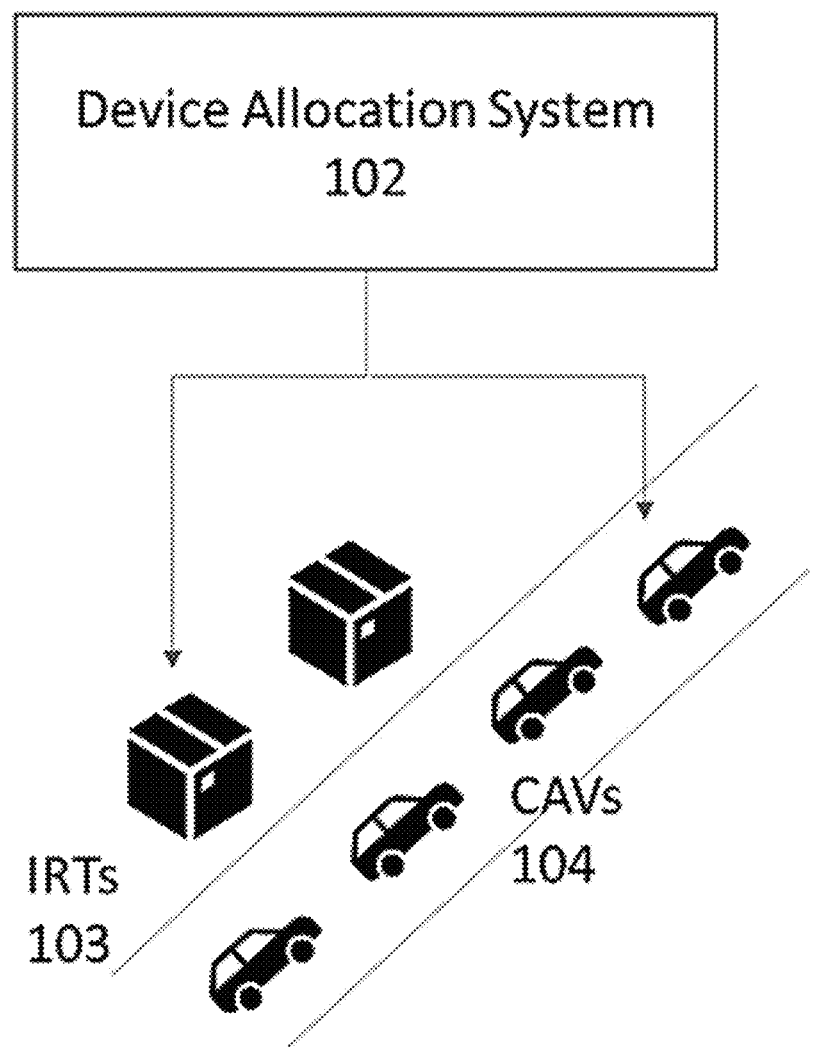
FIG. 1 is a schematic drawing showing a Distributed Driving System (DDS) comprising a Device Allocation System (DAS). 101: Distributed Driving System (DDS); 102: Device Allocation System (DAS); 103: Intelligent Roadside Toolbox (IRT); 104: Connected and Automated Vehicles (CAV).

For example, e.g., as shown in FIG. 1, a DDS comprises a DAS configured to manage, coordinate, allocate, assign, control, and/or distribute resources to devices (e.g., clusters of device systems) of an IRT and CAV. The devices comprise the equipment resources (e.g., hardware and software) used by vehicles (e.g., CAV) and the IRT to provide the functions of automated driving (e.g., sensing functions, transportation behavior prediction and management functions, planning and decision making functions, and vehicle control functions) and the equipment resources (e.g., hardware and software) that support communication.

The DAS technology described herein manages and allocates resources among CAV and IRT (e.g., among devices of the CAV and/or among devices of an IRT) to provide automated driving functions for CAV. In some embodiments, resources refers to computing resources (e.g., microprocessor cycles), communication resources (e.g., wireless and/or wired communication bandwidth (e.g., optical fiber, ethernet, copper cable, Wi-Fi (IEEE 802.11), cellular (e.g., 4G, 5G, etc.), RFID, dedicated short-range communications (DSRC), and/or Bluetooth)), power resources (e.g., electric power), sensing resources (e.g., image, LIDAR, video, sound, microwave radar, ultrasonic radar, millimeter radar, thermometer, or other sensing resources), data storage resources, cloud services, data fusion resources, information resources (e.g., map, weather, traffic, road, historical, satellite navigation (e.g., Global Positioning System (GPS), Differential Global Positioning System (DGPS), BeiDou Navigation Satellite System (BDS) System, or GLONASS Global Navigation Satellite System information), and/or environmental information), and/or other resources to provide and/or support automated driving functions for CAV (e.g., sensing functions, transportation behavior prediction and management functions, planning and decision-making functions, and/or vehicle control functions).

Figure 2:
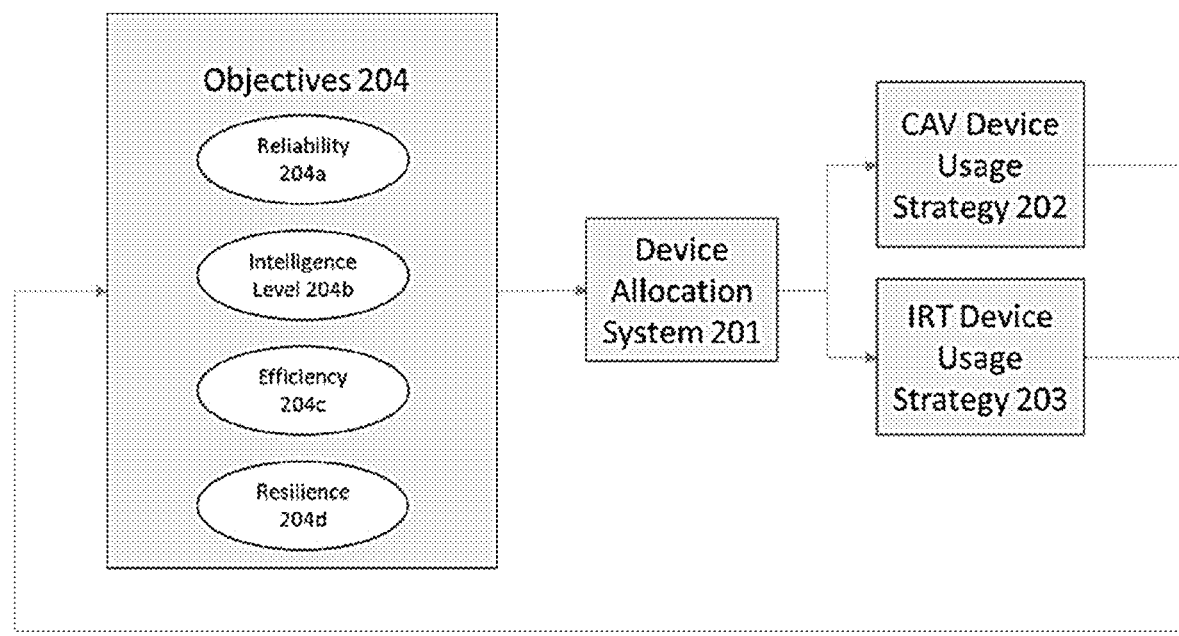
FIG. 2 is a schematic drawing showing a DAS configured to allocate resources among CAV and IRT to maximize DDS system objectives of reliability, intelligence, efficiency and resilience. 201: Device Allocation System (DAS); 202: Device Usage Strategy for CAV; 203: Device Usage Strategy for IRT; 204: Objectives of DAS; 204a: Reliability Objective of DAS; 204b: Intelligence Objective of DAS; 204c: Efficiency Objective of DAS; 204d: Resilience Objective of DAS.

In some embodiments, e.g., as shown in FIG. 2, the DAS is configured to allocate resources to devices (e.g., clusters of device systems) of an IRT and CAV to achieve an objective of the DAS and/or to optimize achieving one or more objectives of the DAS. For example, in some embodiments, the DAS receives a target objective (e.g., from a user input) and provides a Device Usage Strategy for CAV and a Device Usage Strategy for IRT. The device usage strategies are implemented to achieve an objective of the system and/or to optimize achieving one or more objectives of the DAS, e.g., reliability, intelligence, efficiency, and/or resilience.

In some embodiments, the DAS objectives are defined according to one or more system objective levels. For example, in some embodiments, the system objective level is based on four parameters: 1) system intelligence; 2) system reliability; 3) system efficiency; and/or 4) system resiliency. System intelligence refers to the DDS intelligence level.

The DDS intelligence level is indicated by a number from 1 to 5 and a higher number indicates a higher intelligence level.

System reliability refers to a statistical measure of the failure rate of the DDS (e.g., a statistical measure of the expectation that the DDS will fail over a certain length of time, over a certain number functions and/or services provided, over a certain number of outcomes produced, etc.) A higher sigma ("σ") value represents a DDS that performs longer and/or provides more functions and/or services without an error or failure. In particular, the system reliability level indicates the number of standard deviations of a normal distribution within which fall the outcomes produced by the DDS. Accordingly, a higher DDS reliability level indicates a DDS that functions with a lower failure rate. A DDS at system reliability level 3σ is expected to perform without failure approximately 86.6% of the time and/or fail approximately once over a seven-day period. A DDS at system reliability level 4σ is expected to perform without failure approximately 95.4% of the time and/or fail approximately once over a three-week period. A DDS at system reliability level 5σ is expected to perform without failure approximately 98.8% of the time and/or fail approximately once over a three-month period. A DDS at system reliability level 6σ is expected to perform without failure approximately 99.7% of the time and/or fail approximately once a year.

System efficiency represents the percentage increase in driving range provided by the DDS relative to driving range in the absence of the DDS and allocation of resources between CAV and IRT by the DAS.

System resilience represents the ability to restore correct performance of all system functions after a failure or error. The lower the recovery time interval, the better the system performance.

In some embodiments, the system objective level is 1, 2, 3, 4, or 5. In some embodiments, the system intelligence level is 1, 2, 3, 4, or 5. In some embodiments, the system reliability level is 3σ, 4σ, 5σ, or 6σ. In some embodiments, the system efficiency level is ≤10%, ≤20%, ≤30%, ≤40%, or ≤50%. In some embodiments, the system resilience level provides recovery in days (e.g., less than 10, 9, 8, 7, 6, 5, 4, 3, or 2 days), recovery in hours (e.g., less than 24, 23, 22, 21, 20, 19, 18, 17, 16, 15, 14, 13, 12, 11, 10, 9, 8, 7, 6, 5, 4, 3, or 2 hours), recovery in minutes (e.g., less than 60, 55, 50, 45, 40, 35, 30, 25, 20, 15, 10, 5, 4, 3, or 2 minutes), recovery in seconds (e.g., less than 60, 55, 50, 45, 40, 35, 30, 25, 20, 15, 10, 5, 4, 3, or 2 seconds), or recovery in milliseconds (e.g., less than 1000, 900, 800, 700, 600, 500, 400, 300, 200, 100, 50, 25, 20, 15, 10, 9, 8, 7, 6, 5, 4, 3, or 2 milliseconds). In some embodiments, system objective level 1 provides a system intelligence at level 1, a system reliability at $3\sigma$, a system efficiency at ≤10%, and/or a system resiliency that provides recovery in days. In some embodiments, system objective level 2 provides a system intelligence at level 2, a system reliability at $4\sigma$, a system efficiency at ≤20%, and/or a system resiliency that provides recovery in hours. In some embodiments, system objective level 3 provides a system intelligence at level 3, a system reliability at $5\sigma$, a system efficiency at ≤30%, and/or a system resiliency that provides recovery in minutes. In some embodiments, system objective level 4 provides a system intelligence at level 4, a system reliability at $5\sigma$, a system efficiency at ≤40%, and/or a system resiliency that provides recovery seconds. In some embodiments, system objective level 5 provides a system intelligence at level 5, a system reliability at $6\sigma$, a system efficiency at ≤50%, and/or a system resiliency that provides recovery in milliseconds. See, e.g., Table 1.

TABLE 1

System objective levels

| System objective level | System Intelligence | System reliability | System efficiency | System resilience |
|---|---|---|---|---|
| 1 | 1 | $3\sigma$ | ≤10% | Recovery in days |
| 2 | 2 | $4\sigma$ | ≤20% | Recovery in hours |
| 3 | 3 | $5\sigma$ | ≤30% | Recovery in minutes |
| 4 | 4 | $5\sigma$ | ≤40% | Recovery in seconds |
| 5 | 5 | $6\sigma$ | ≤50% | Recovery in milliseconds |

Furthermore, in some embodiments, the DDS is configured to function at different automation levels (e.g., Level 0, 1, 2, 3, 4, or 5). In some embodiments, the DDS provides automation functions at automation Level 0 and provides no automation functions. In some embodiments, the DDS provides automation functions at automation Level 1 comprising collecting and providing information to assist driving. For example, a DDS providing Level 1 automation provides primitive sensing functions (e.g., aggregated traffic data collection), basic planning and decision making to support drivers, and information having low spatial and temporal resolution.

In some embodiments, the DDS provides automation functions at Level 2 comprising providing I2X (infrastructure-to-everything) communication and vehicle guidance for driving assistance. For example, a DDS providing Level 2 automation provides Level 1 automation functions and the DDS further provides supplementary sensing functions comprising pavement condition detection and/or vehicle kinematics detection (e.g., vehicle lateral position, vehicle longitudinal position, vehicle velocity, and/or vehicle acceleration) for a portion of traffic on a timescale of seconds or minutes. In some embodiments, a DDS providing Level 2 automation also provides traffic information and vehicle control suggestions and instructions for a vehicle using I2X communication.

In some embodiments, the DDS provides automation functions at Level 3 comprising providing dedicated lane automation. For example, a DDS providing Level 3 automation provides Level 1 automation functions and Level 2 automation functions and the DDS further provides individual vehicles with information describing the dynamics of surrounding vehicles and other objects in milliseconds and supports full automated driving on DDS-compatible vehicle-dedicated lanes.

In some embodiments, the DDS provides automation functions at Level 4 comprising providing scenario-specific automation. For example, a DDS providing Level 4 automation provides Level 1 automation functions, Level 2 automation functions, and Level 3 automation functions and further provides detailed driving instructions for vehicles to realize full automation when driving in certain scenarios or in certain areas (e.g., predefined geofenced areas) where the traffic is mixed (e.g., comprises DDS-compatible and DDS-incompatible vehicles). In some embodiments, essential vehicle-based automation capabilities (e.g., emergency braking) provide a standby and/or backup system to provide vehicle control and function during a DDS failure.

In some embodiments, the DDS provides automation functions at Level 5 comprising full infrastructure automation. For example, a DDS providing Level 5 automation provides Level 1 automation functions, Level 2 automation functions, Level 3 automation functions, and Level 4 automation functions and further provides full control and management of individual vehicles for all scenarios and optimizes the whole road and traffic network where the DDS is deployed. In some embodiments, the DDS provides full safety functions and vehicle automation functionalities are not implemented as standby and/or backup for emergencies.

Figure 3:
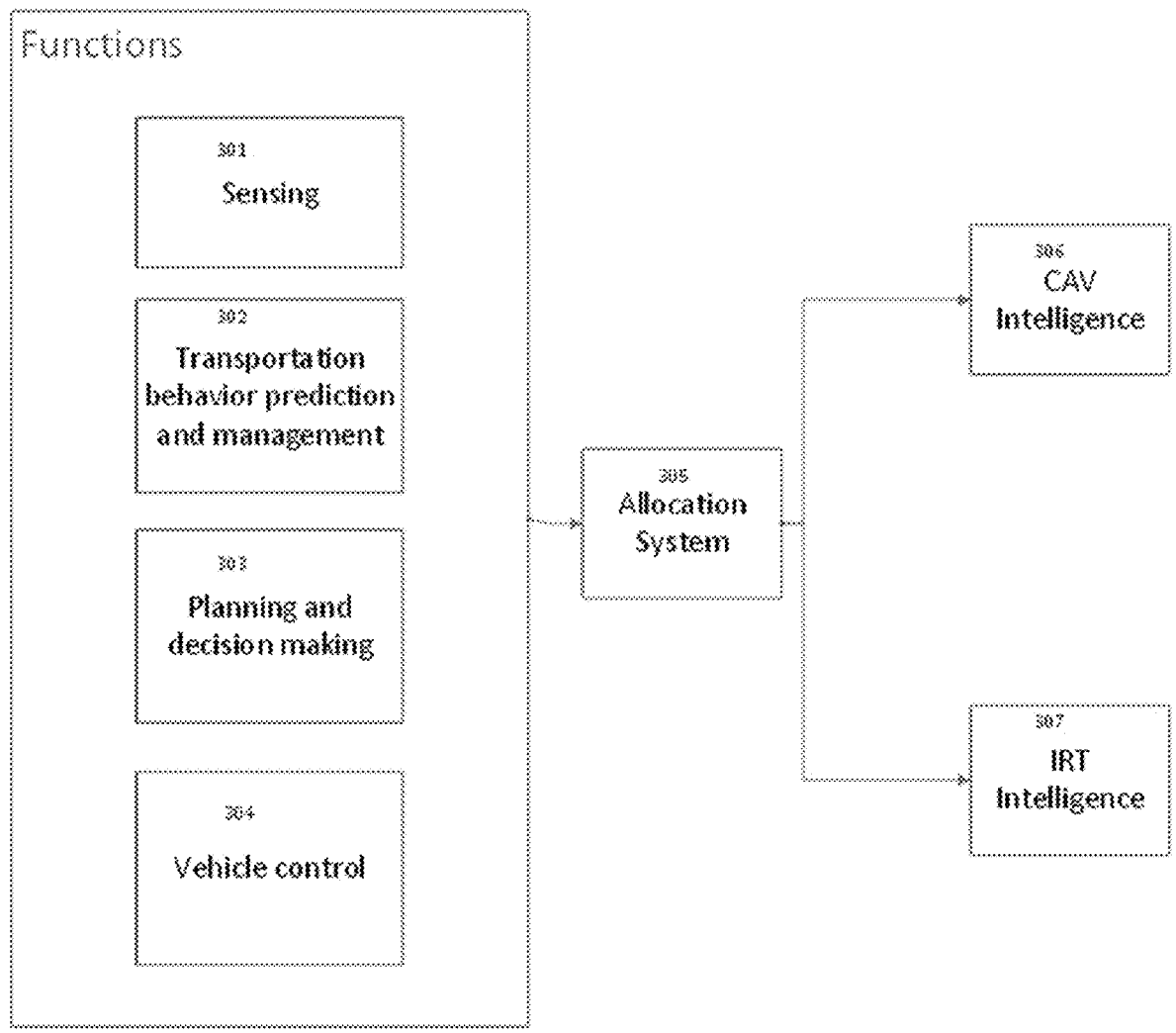
FIG. 3 is a schematic drawing showing a DAS configured to allocate intelligence among CAV and IRT to provide sensing functions, transportation behavior prediction and management functions, planning and decision making functions, and vehicle control functions. 301: sensing function; 302: transportation behavior prediction and management function; 303: planning and decision making function; 304: vehicle control function; 305: intelligence allocation system; 306: CAV intelligence level; 307: IRT intelligence level.

In some embodiments, e.g., as shown in FIG. 3, the DAS is configured to allocate intelligence among devices of the IRT and DDS. In some embodiments, the DDS allocates intelligence among devices of the IRT and DDS to provide sensing functions, transportation behavior prediction and management functions, planning and decision making functions, and vehicle control functions. In some embodiments, the DAS comprises an intelligence allocation system that allocates intelligence between CAV intelligence and IRT intelligence to provide sensing functions, transportation behavior prediction and management functions, planning and decision making functions, and vehicle control functions. In some embodiments, the intelligence allocation system collects, identifies, and/or produces a function target or goal comprising targets for sensing functions, transportation behavior prediction and management functions, planning and decision making functions, and vehicle control functions. Then, in some embodiments, an allocation strategy is determined, provided, and/or produced to meet the function target or goal by allocating resources to the CAV and IRT according to the intelligence level of CAV and the intelligence level of IRT and what resources are appropriate to provide the CAV and IRT to meet the function target or goal.

Figure 4:
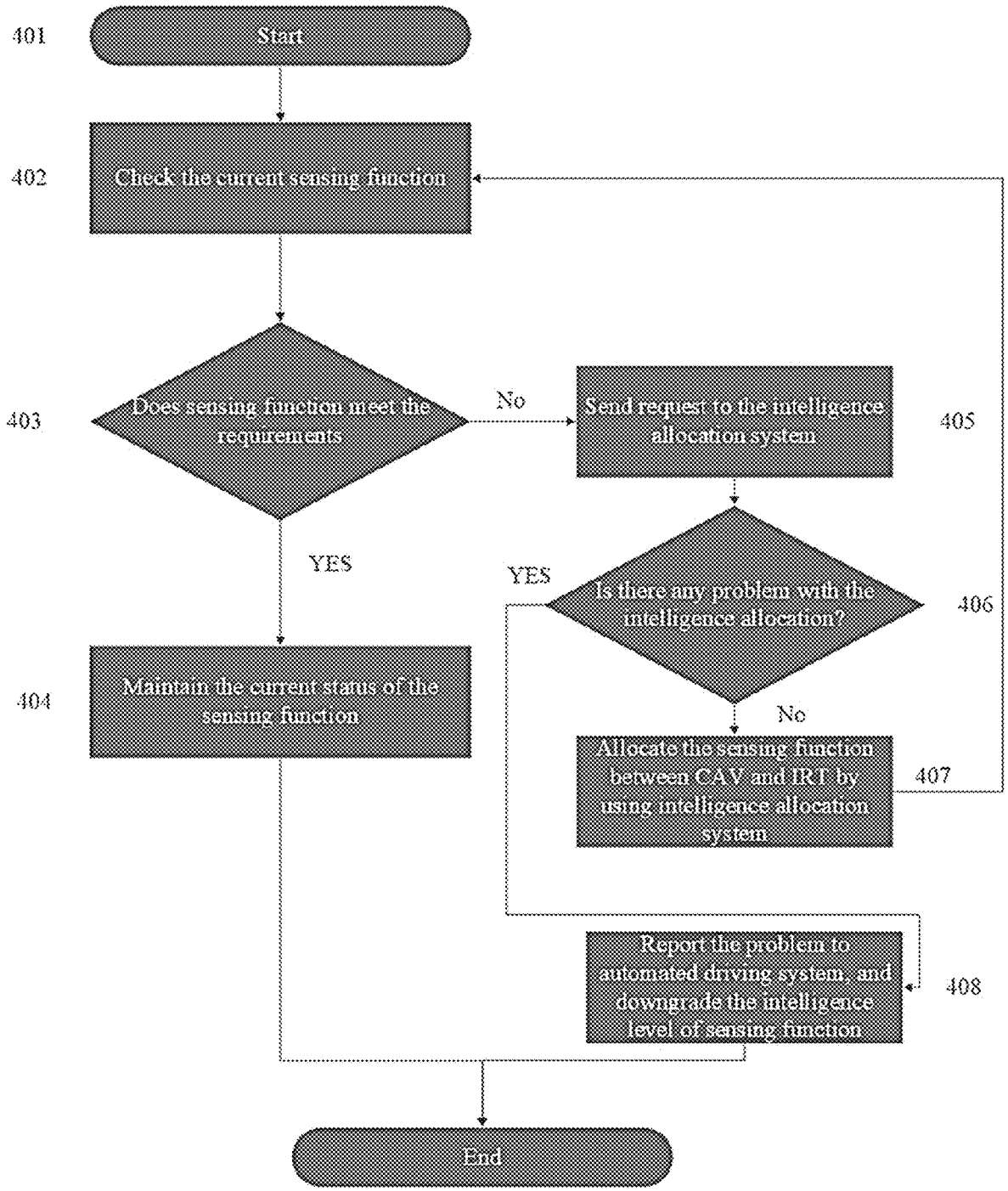
FIG. 4 is flowchart describing intelligence allocation processes and systems. 401: Start checking the process; 402: Checking the current sensing function; 403: Checking if the current sensing function meets a requirement; 404: Maintaining current status; 405: Sending request to allocation system; 406: Checking intelligence allocation; 407: Allocating sensing function between CAV and IRT; 408: Reporting problem.

In some embodiments, e.g., as shown in FIG. 4, the DAS is configured to perform methods for allocating sensing function among the CAV and IRT. For example, in some embodiments, the DDS checks the sensing function and determines if the sensing function meets the requirements for automated driving at the current intelligence level. If the requirements are not met, the system sends a request for intelligence resources (e.g., sensing resources) to the intelligence allocation system. Then, the intelligence allocation system allocates the sensing function between CAV and IRT to provide the appropriate sensing function for the DDS and/or CAV.

Figure 5:
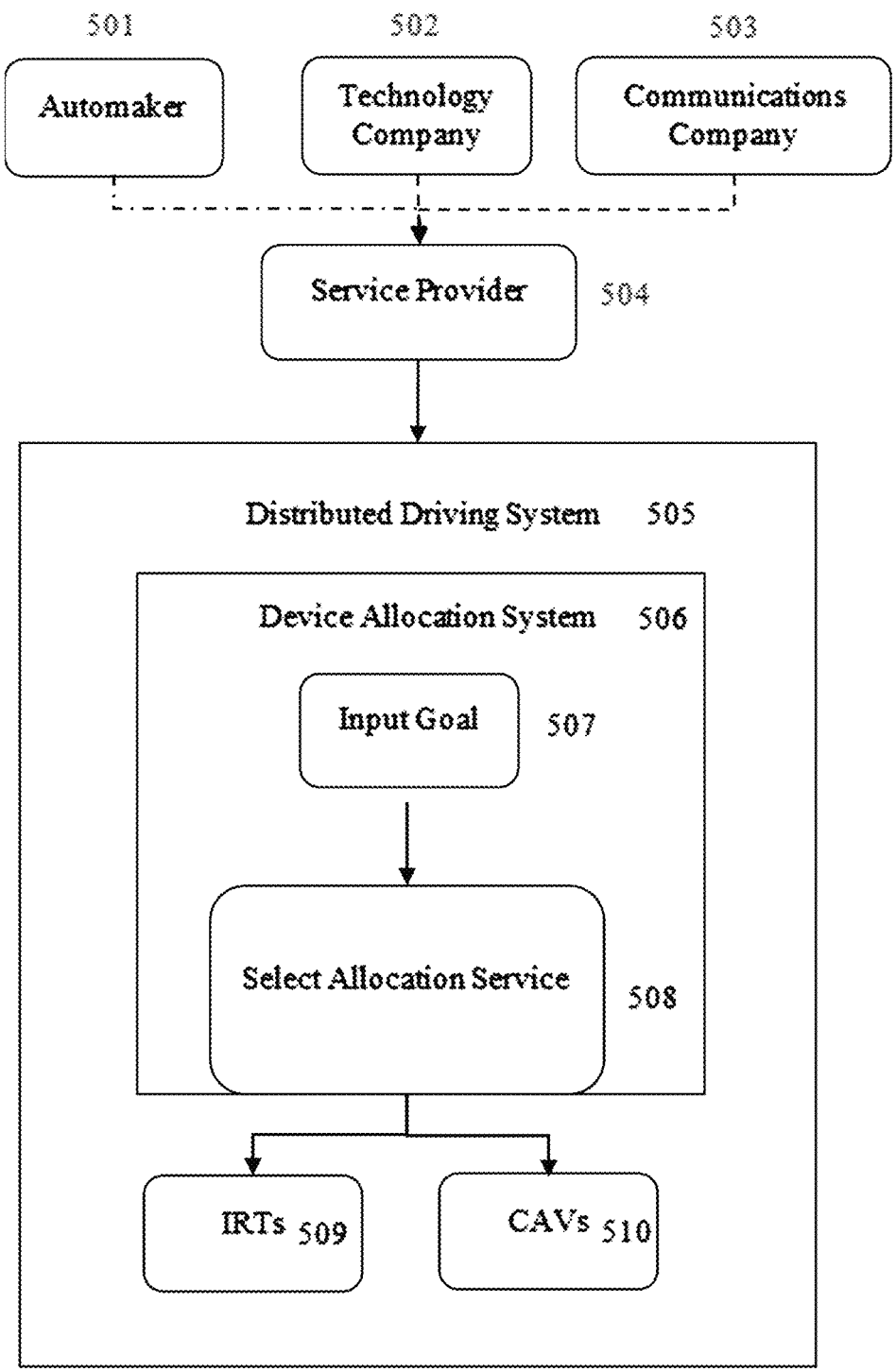
FIG. 5 is a schematic drawing showing a service provider providing and/or using a DAS. 501: Automaker; 502: Technology company; 503: Communication company; 504: Service provider (e.g., Automakers, Technology companies, and/or Communication companies); 505: Distribution Driving System; 506: Device Allocation system; 507: Service provider input goal for DDS; 508: Component configured to select allocation service from DDS; 509: IRT; 510: CAV.

In some embodiments, e.g., as shown in FIG. 5, the DAS is configured to manage CAV and IRT according to service provider preferences and goals. For example, in some embodiments, the DAS described herein finds use by various service providers (e.g., automaker, technology company, communication company) that have different goals. In particular, service providers may have specific requirements and/or demands from the DDS. Accordingly, the DAS is configured to allocate resources to meet the service provider preferences and/or goals. After the DAS receives a service provider preference and/or goal, the DAS selects an appropriate allocation service that meets service provider preferences and/or goals of controlling and/or managing IRT and CAV.

Figure 6:
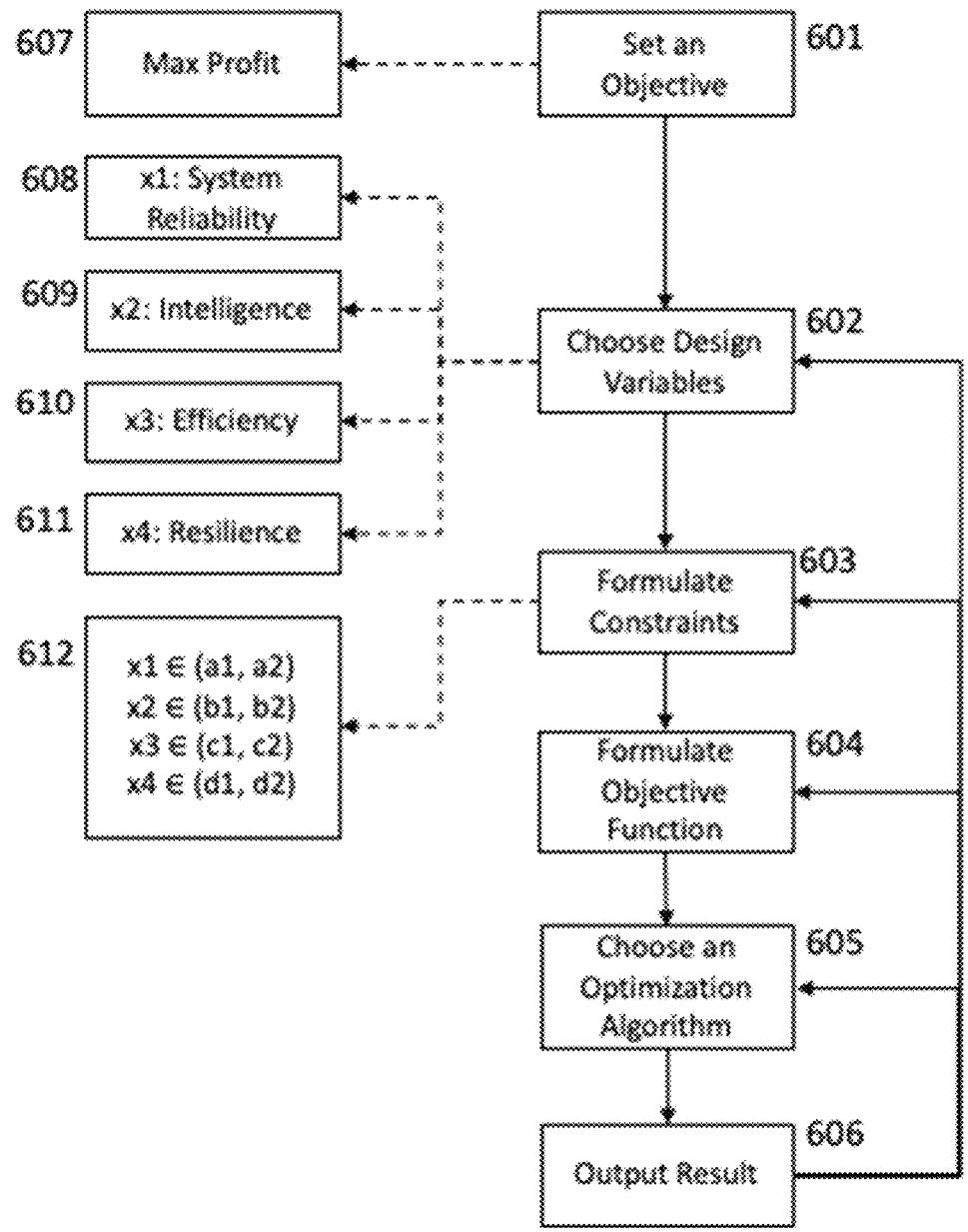
FIG. 6 is a flow diagram showing processes for maximizing (e.g., optimizing) profits for service providers. 601: Setting an Objective; 602: Choosing Design Variables; 603: Formulating Constraints; 604: Formulating Objective Function; 605: Choosing an Optimization Algorithm; 606: Outputting Result; 607: Maximum Profit; 608: Variable x1: System Reliability; 609: Variable x2: Intelligence; 610: Variable x3: Efficiency; 611: Variable x4: Resilience; 612: Variable Constraints.
Figure 7:
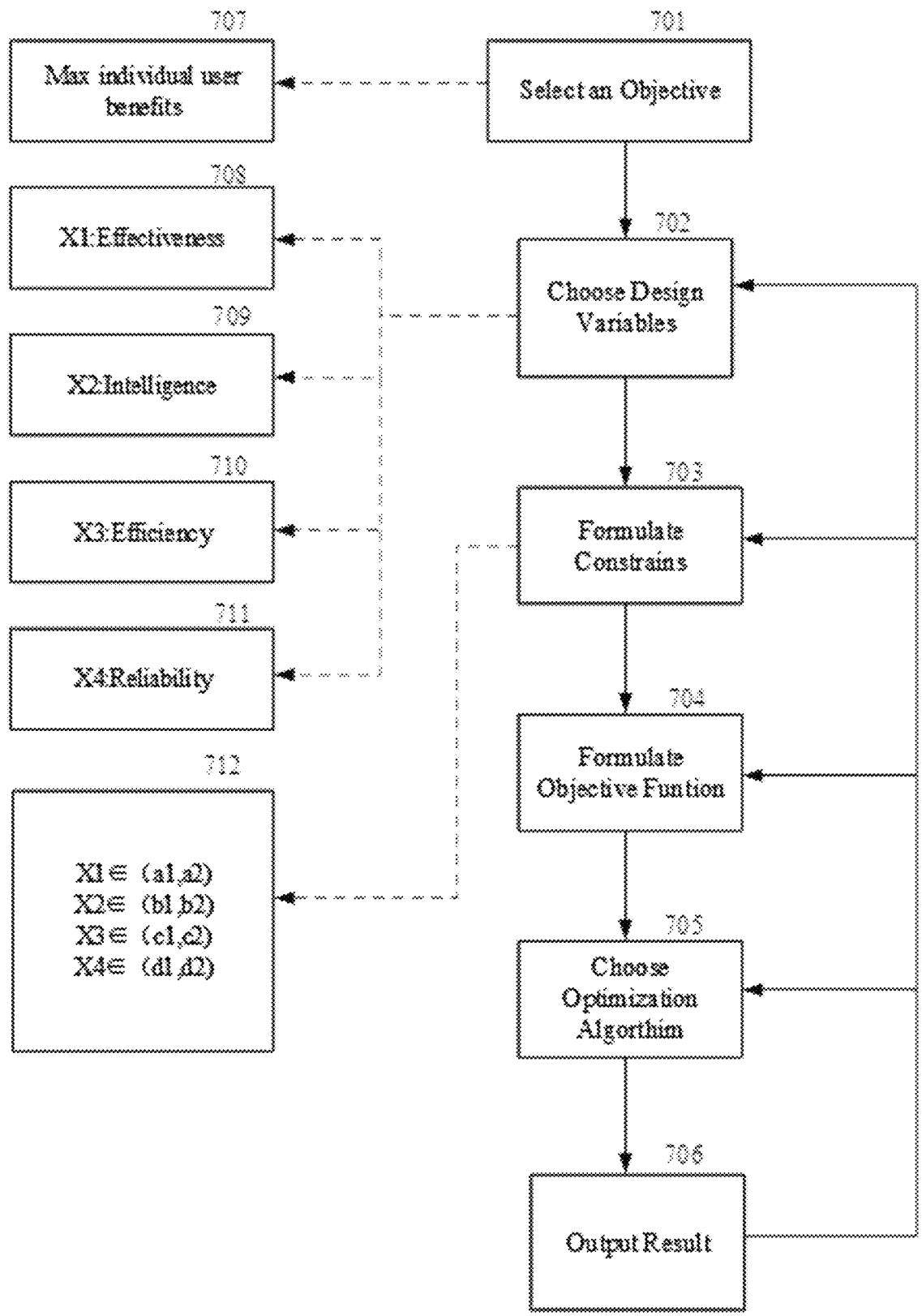
FIG. 7 is a flow diagram showing processes for maximizing (e.g., optimizing) benefits for individual users. 701: Setting an Objective; 702: Choosing Design Variables; 703.

In some embodiments, e.g., as shown in FIG. 6 and FIG. 7, the DAS is configured to optimize an objective. As an exemplary objective for optimization, FIG. 6 shows optimizing (e.g., maximizing) profit for a service provider. In some embodiments, optimization methods comprise identifying an optimization objective (e.g., maximizing profit). In some embodiments, methods comprise choosing design variables (e.g., system reliability, intelligence, efficiency, and/or resilience). In the particular example shown in FIG. 6, these four parameters are related to the objective and are considered for maximizing the profit of service providers. In some embodiments, methods comprise providing and/or determining variable constraints (e.g., an upper bound and/or a lower bound) for each variable. In some embodiments, methods comprise a specialized process for determining variable constraints. In some embodiments, an objective function is produced using the chosen variables and their constraints; the objective function is used to apply an optimization algorithm; and a result is calculated. In some embodiments, the result is used as feedback to recursively optimize the objective function. In some embodiments, the variables, constraints, and algorithm are revised according to validation. And, in some embodiments, an optimized result is determined by following the revised processes.

As another exemplary objective for optimization, FIG. 7 shows optimizing (e.g., maximizing) a benefit for an individual user (e.g., a CAV driver). In some embodiments, methods comprise choosing an optimization goal or objective (e.g., maximizing user benefits). In some embodiments, methods comprise choosing design variables (e.g., effectiveness, intelligence, efficiency, and reliability). In the particular example shown in FIG. 7, these four variables are related to the objective and are considered for maximizing the benefit of users, e.g., the optimization process optimizes the effectiveness, intelligence, efficiency, and reliability for an individual user of the system. In some embodiments, methods comprise providing and/or determining variable constraints (e.g., an upper bound and/or a lower bound) for each variable. In some embodiments, methods comprise a specialized process for determining variable constraints. In some embodiments, methods comprise producing an objective function, e.g., to provide guidance for the optimization algorithm. In some embodiments, producing an objective function is based on the constraints of the design variables. In some embodiments, methods comprise choosing an optimization algorithm, e.g., to calculate a result. In some embodiments, the result is used as feedback to recursively optimize the objective function. In some embodiments, the variables, constraints, and algorithm are revised according to validation. And, in some embodiments, an optimized result is determined by following the revised processes.

In some embodiments, e.g., as shown in FIG. 8, the DAS is configured to allocate resources for an IRT providing coverage of critical points on a road and/or for roads having incomplete coverage by IRT services. In the example shown in FIG. 8, a vehicle at automation level 2 exits a normal road area and enters a critical area covered by IRT services. Next, the DAS allocates resources to the IRT and vehicle and helps the vehicle to achieve a higher level of automated driving within the critical area (e.g., to navigate successfully through the critical area).

In some embodiments, e.g., as shown in FIG. 9, the DAS is configured to provide dynamic device allocation. In some embodiments, the DAS comprises a dynamic device allocation subsystem. In some embodiments, the dynamic device allocation subsystem allocates resources dynamically and/or iteratively. For example, in some embodiments, the DAS monitors the conditions (e.g., time, location of CAV and/or IRT, IRT conditions, and environment of CAV and/or IRT). Depending on the conditions, the DAS determines if the condition changes. If the conditions do not change, the dynamic device allocation subsystem maintains the monitoring. If the conditions change, the strategy is recalculated. In some embodiments, the dynamic device allocation subsystem checks if the resource allocation process is killed. If the process is killed, then the process ends. If the process is not killed, the dynamic device allocation subsystem outputs an allocation strategy to CAV.

Accordingly, embodiments of the technology provided herein relate to a DAS (e.g., of a DDS) that allocates resources to CAV and IRT, e.g., to provide dynamic and customizable services to individual vehicles based on requirements identified by an auto manufacturer, industry alliance, driver subscription to the DDS, identification of CAV resource needs by the DDS, etc. The IRT of the DDS provides a flexible and expandable service for CAVs (e.g., CAVs at different automation levels). The IRT is vehicle oriented to support the automated driving of CAVs. For example, a CAV operating at a first automation level can request supplemental services from the IRT to operate at a higher automation level.

In some embodiments, the technology comprises a DAS, a DDS, an IRT, and communications media for transmitting data among CAV and IRT and among the DAS, DDS, and IRT. According to the DDS technology, a CAV onboard system is configured to generate control instructions for the automated driving of a CAV comprising the onboard system and the IRT provides customized, on-demand, and dynamic IRT functions to individual CAVs for system security and backup, vehicle performance optimization, computing and management, and dynamic utility management (DUM) and information provision.

Connected and Automated Vehicle and Highway (CAVH) Systems

In some embodiments, the technology described herein relates to a system for providing vehicle operations and control to connected and automated vehicle and highway (CAVH) systems by sending detailed and time-sensitive control instructions to individual vehicles. In some embodiments, the technology improves, interacts with, and/or comprises aspects (e.g., components) of a system-oriented and fully-controlled automated vehicle highway (CAVH) system configured to provide various levels of connected and automated vehicles and highways, e.g., as described in U.S. Pat.

App. Pub. No. 20180336780, incorporated herein by reference. In some embodiments, the technology improves, interacts with, and/or comprises aspects (e.g., components) of an Intelligent Road Infrastructure System (IRIS), which facilitates vehicle operations and control for CAVH systems, e.g., as described in U.S. Pat. App. Pub. No. 20190244521 and/or U.S. Pat. App. Pub. No. 20190096238, each of which is incorporated herein by reference.

Vehicle Control Unit/Onboard Unit

In some embodiments, a CAV comprises a vehicle control unit (VCU) (e.g., an on-board unit (OBU) that communicates with a vehicle infrastructure coordination transportation system, e.g., a DDS and/or CAVH system (e.g., as described in U.S. Pat. App. Pub. No. 20200021961; U.S. Pat. No. 7,421,334; or U.S. Pat. No. 7,554,435, each of which is incorporated herein by reference). In some embodiments, the VCU and/or OBU comprises sensing modules to sense and characterize the driving environment and components configured to communicate with other vehicles and/or infrastructure components (e.g., IRT and/or components of a CAVH system). In some embodiments, the VCU and/or OBU transmits sensor data to an IRT and/or a component of a CAVH system. In some embodiments, a VCU and/or OBU comprises a component (e.g., a vehicle control module or vehicle control unit) that interfaces with the mechanical components of a CAV to provide mechanical control of a CAV according to control instructions provided by the VCU and/or OBU, by the VCU and/or OBU and IRT, and/or by the IRT. In some embodiments, a VCU and/or OBU communicates with a component (e.g., a vehicle control module or vehicle control unit) that interfaces with the mechanical components of a CAV to provide mechanical control of a CAV according to control instructions provided by the VCU and/or OBU, by the VCU and/or OBU and IRT, and/or by the IRT.

In some embodiments, the technology comprises data flows, e.g., between sensors and/or information collecting modules and data fusion modules (e.g., a VCU and/or OBU and/or the IRT). In some embodiments, a vehicle subsystem collects vehicle sensor data from sensors on the exterior of the CAV, cabin passenger data from sensors in the interior of the CAV, and/or basic safety messages from a controller area network (CAN) bus interface. In some embodiments, vehicle sensor data, cabin passenger data, and/or basic safety messages data are sent to a VCU and/or OBU for data fusion. In some embodiments, the IRT collects roadside sensor data, e.g., using sensors mounted on IRT. In some embodiments, sensor data are sent to the IRT for data fusion.

In some embodiments, the VCU and/or OBU comprises a communication module configured to communicate with an IRT. In some embodiments, the VCU and/or OBU comprises a communication module configured to communicate with another VCU and/or OBU. In some embodiments, the VCU and/or OBU comprises a data collection module configured to collect data from external vehicle sensors and/or internal vehicle sensors; and to monitor vehicle status and driver status. In some embodiments, the VCU and/or OBU comprises a vehicle control module configured to execute control instructions for driving tasks. In some embodiments, the driving tasks comprise car following and/or lane changing. In some embodiments, the control instructions are received from an IRT.

In some embodiments, the VCU and/or OBU is configured to control a vehicle (e.g., by producing control instructions for an individual vehicle) using data and information received from an IRT. In some embodiments, the data received from an IRT comprises: vehicle control information and/or instructions; travel route and traffic information; and/or services information. In some embodiments, the vehicle control instructions comprise customized, detailed, and time-sensitive control instructions for an individual vehicle. In some embodiments, the vehicle control instructions comprise a longitudinal acceleration rate, a lateral acceleration rate, and/or a vehicle orientation for an individual vehicle. In some embodiments, the travel route and traffic information comprise traffic conditions, incident location, intersection location, entrance location, and/or exit location. In some embodiments, the services data comprises the location of a fuel station and/or location of a point of interest. In some embodiments, VCU and/or OBU is configured to send data to an IRT. In some embodiments, the data sent to said IRT comprises: utility and/or cost information; driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module. In some embodiments, the VCU and/or OBU is configured to collect data comprising: vehicle engine status; vehicle speed; surrounding objects detected by vehicles; and/or driver conditions. In some embodiments, the VCU and/or OBU is configured to assume control of a vehicle.

Intelligent Roadside Toolbox (IRT)

In some embodiments, the technology relates to allocating resources to an Intelligent Roadside Toolbox (IRT) (e.g., as described in U.S. Pat. App. Ser. No. 63/004,551, incorporated herein by reference in its entirety). In some embodiments, the IRT provides modular (e.g., real-time and ad hoc) access to CAVH and IRIS technologies according to the automated driving needs of a particular vehicle. In some embodiments, modular (e.g., ad hoc) access to CAVH and IRIS technologies are provided as services (e.g., sensing services, transportation behavior prediction and management services, planning and decision-making services, and/or vehicle control services).

For example, in some embodiments, the IRT described herein provides a flexible and expandable service for vehicles at different automation levels. In some embodiments, the services provided by the IRT are dynamic and customized for particular vehicles, for vehicles produced by a particular manufacturer, for vehicles associated by a common industry alliance, for vehicles subscribing to a DDS, etc. While CAVH technologies relate to centralized systems configured to provide individual vehicles with customized, detailed, and time-sensitive control instructions and traffic information to all vehicles using the CAVH system for automated vehicle driving regardless of vehicle capability and/or automation level and thus provide a homogeneous service, the IRT technologies described herein are vehicle-oriented, modular, and customizable for each vehicle to meet the specific needs of each individual vehicle as an on-demand and dynamic service. In some embodiments, a vehicle onboard system is configured to generate control instructions for automated driving of a CAV comprising the vehicle onboard system; and the IRT provides customized, on-demand, and dynamic IRT functions to individual CAVs (e.g., sensing services, transportation behavior prediction and management services, planning and decision-making services, vehicle control services, system security and backup, vehicle performance optimization, computing and management, and dynamic utility management (DUM) and information provision).

In some embodiments, the IRT provides customized, on-demand, and dynamic IRT functions to improve safety and stability of individual CAVs according to the needs of individual CAVs by assembling IRT functions and providing IRT functions to individual CAVs. In some embodiments, the IRT is configured to provide a customized service for vehicle manufacturers and/or driving services providers, the customized service comprising remote-control service, pavement condition detection, and/or pedestrian prediction. In some embodiments, the IRT is configured to receive information from a vehicle OBU, electronic stability program (ESP), and/or vehicle control unit (VCU).

In some embodiments, the IRT is configured to integrate sensor and/or driving environment information from different resources to provide integrated sensor and/or driving environment information and pass the integrated sensor and/or driving environment information to a prediction module. In some embodiments, the IRT is configured to provide customized, on-demand, and dynamic IRT functions to individual CAVs for sensing, transportation behavior prediction and management, planning and decision-making, and/or vehicle control. In some embodiments, sensing comprises providing information in real-time, short-term, and/or long-term for transportation behavior prediction and management, planning and decision-making, and/or vehicle control. In some embodiments, the IRT is configured to provide customized, on-demand, and dynamic IRT sensing functions for automated driving of a CAV using information obtained from the CAV and/or other CAVs and/or information obtained from the IRT. In some embodiments, the IRT is configured to provide customized, on-demand, and dynamic IRT transportation behavior prediction and management functions for automated driving of a CAV, wherein the transportation behavior prediction and management functions predict the behavior of surrounding vehicles, pedestrians, bicycles, and other moving objects.

In some embodiments, the transportation behavior prediction and management functions provide prediction support comprising providing raw data and/or providing features extracted from raw data; and/or a prediction result, wherein prediction support and/or a prediction result is/are provided to a CAV based on the prediction requirements of the CAV. In some embodiments, the IRT is configured to provide customized, on-demand, and dynamic IRT planning and decision-making functions for automated driving of a CAV. In some embodiments, the planning and decision-making functions provide path planning comprising identifying and/or providing a detailed driving path at a microscopic level for automated driving of a CAV; route planning comprising identifying and/or providing a route for automated driving of a CAV; special condition planning comprising identifying and/or providing a detailed driving path at a microscopic level and/or a route for automated driving of a CAV during special weather conditions or event conditions; and/or disaster solutions comprising identifying and/or providing a detailed driving path at a microscopic level and/or a route for automated driving of a CAV during a disaster, wherein path planning, route planning, special condition planning, and/or disaster solutions is/are provided to a CAV based on the planning and decision-making requirements of the CAV.

In some embodiments, the IRT comprises a control module and a decision-making module. In some embodiments, the IRT is configured to provide customized, on-demand, and dynamic IRT vehicle control functions for automated driving of a CAV. In some embodiments, the vehicle control functions are supported by customized, on-demand, and dynamic IRT sensing functions; customized, on-demand, and dynamic IRT transportation behavior prediction and management functions; and/or customized, on-demand, and dynamic IRT planning and decision-making functions. In some embodiments, vehicle control functions provide lateral control, vertical control, platoon control, fleet management, and system failure safety measures for a CAV. In some embodiments, system failure safety measures are configured to provide sufficient response time for drivers to assume control of a vehicle during system failure and/or to stop vehicles safely. In some embodiments, the vehicle control functions are configured to determine the computation resources supporting automated driving of a CAV and request and/or provide supplemental computation resources from the IRT. In some embodiments, the control module is configured to integrate and/or process information provided by the decision-making module and to send vehicle control commands to CAVs for automated driving of the CAVs.

In some embodiments, the IRT comprises hardware modules. In some embodiments, the hardware modules comprise one or more of, e.g., a sensing module comprising sensors, a communications module, and/or a computation module. In some embodiments, the IRT comprises software modules. In some embodiments, the software modules comprise one or more of e.g., sensing software configured to use information from a sensing module to provide object detection and mapping; and decision-making software configured to provide paths, routes, and/or control instructions for CAVs.

In some embodiments, the IRT is configured to collect sensor data describing the environment of a CAV; and provide at least a subset of the sensor data to a CAV to supplement CAV automated driving level. In some embodiments, the sensor data is provided by an IRT sensing module. In some embodiments, the sensor data and the subset of the sensor data are communicated between the IRT and the CAV over a communications medium. In some embodiments, the sensor data comprises information describing road conditions, traffic signs and/or signals, and objects surrounding the CAV. In some embodiments, the IRT is further configured to integrate the data; provide the data to a prediction, planning, and decision-making system; store the data; and/or retrieve the at least a subset of data.

Distributed Driving System

In some embodiments, the DAS described herein is provided to support a distributed driving system (DDS) (e.g., as described in U.S. Pat. App. Ser. No. 62/894,703, incorporated herein by reference in its entirety). In some embodiments, the IRT provides modular (e.g., ad hoc) access to CAVH and IRIS technologies according to the automated driving needs of a particular vehicle. In some embodiments, modular (e.g., ad hoc) access to CAVH and IRIS technologies are provided as services (e.g., sensing services, transportation behavior prediction and management services, planning and decision-making services, and/or vehicle control services). In some embodiments, the DAS allocates DDS resources among IRT and CAV, e.g., to provide an automated driving level for a CAV.

For example, in some embodiments, the IRT described herein provides a flexible and expandable service for vehicles at different automation levels. In some embodiments, the services provided by the IRT are dynamic and customized for particular vehicles, for vehicles produced by a particular manufacturer, for vehicles associated by a common industry alliance, for vehicles subscribing to a DDS to obtain services from the IRT, etc. While CAVH technologies relate to centralized systems configured to provide individual vehicles with customized, detailed, and time-sensitive control instructions and traffic information to all vehicles using the CAVH system for automated vehicle driving regardless of vehicle capability and/or automation level and thus provide a homogeneous service, the DAS, DDS, and IRT technologies described herein are vehicle-oriented, modular, and customizable for each vehicle to meet the specific needs of each individual vehicle as an on-demand and dynamic service.

In some embodiments, the DAS and IRT technologies described herein are provided as a component of a DDS. In some embodiments, the IRT and DAS technologies described herein interact with a DDS. In some embodiments, the DDS comprises: 1) one or more connected and automated vehicles (CAVs) comprising a vehicle onboard system; 2) an intelligent roadside toolbox (IRT); and 3) communications media (e.g., wireless communications (e.g., real-time wireless communications media)) for transmitting data between the CAVs, DAS, and the IRT. In some embodiments, a vehicle onboard system is configured to generate control instructions for automated driving of a CAV comprising the vehicle onboard system; and the IRT provides customized, on-demand, and dynamic IRT functions to individual CAVs (e.g., sensing services, transportation behavior prediction and management services, planning and decision-making services, vehicle control services, system security and backup, vehicle performance optimization, computing and management, and dynamic utility management (DUM) and information provision).

In some embodiments, the DDS is configured to provide on-demand and dynamic IRT functions to individual CAVs to avoid trajectory conflicts with other vehicles (e.g., collision avoidance) and/or to adjust vehicle route and/or trajectory for abnormal driving environments (e.g., weather events, natural disasters, traffic accidents, etc.) In some embodiments, the DDS comprises a DUM module configured to optimize use of resources by CAVs at various vehicle intelligence levels by performing a method comprising assembling IRT functions to provide to CAVs; and balancing CAV onboard system costs. In some embodiments, the CAV onboard system costs comprise computation ability cost (C), number of computational units cost (NU), fuel consumption cost (P), and climate control and/or driver comfort (e.g., acceleration and/or deceleration) cost (V). In some embodiments, the DUM module is configured to optimize resources by CAVs at various vehicle intelligence levels by optimizing a cost function (e.g., identifying an optimal minimum of the cost function) describing the total cost to implement an automated driving system as a sum of functions (e.g., functions providing positive values) for computation ability cost (C), number of computational units cost (NU), fuel consumption cost (P), climate control and/or driver comfort (e.g., acceleration and/or deceleration) cost (V), and/or IRT cost (I).

In some embodiments, the IRT provides customized, on-demand, and dynamic IRT functions to improve safety and stability of individual CAVs according to the needs of individual CAVs by assembling IRT functions and providing IRT functions to individual CAVs. In some embodiments, the DDS is configured to measure the performance of a CAV according to an index describing the computational ability of the CAV, the emission output of the CAV, the energy consumption of the CAV, and/or the comfort of a driver of the CAV. In some embodiments, computational ability comprises computation speed for sensing, prediction, decision-making, and/or control; energy consumption comprises fuel economy and/or electricity economy; and the comfort of the driver comprises climate control and/or acceleration/deceleration of the CAV.

In some embodiments, the DDS is configured to provide a customized IRT to supplement an individual CAV according to vehicle manufacturer designs to improve CAV performance. In some embodiments, the DDS is configured to provide supplemental functions to an individual CAV in response to the value of a vehicle cost function exceeding a threshold and/or in response to detecting a component, function, and/or service failure. In some embodiments, the IRT is configured to provide a customized service for vehicle manufacturers and/or driving services providers, the customized service comprising remote-control service, pavement condition detection, and/or pedestrian prediction. In some embodiments, the IRT is configured to receive information from a vehicle OBU, electronic stability program (ESP), and/or vehicle control unit (VCU).

In some embodiments, the DDS is configured to determine CAV information and/or functional requirements based on a cost function describing the total cost to implement an automated driving system as a sum of functions for computation ability cost (C), number of computational units cost (NU), fuel consumption cost (P), climate control and/or driver comfort (e.g., acceleration and/or deceleration) cost (V), and/or IRT cost (I); and send the information and/or functional requirements to the IRT for providing supplemental information and/or functions to a CAV.

In some embodiments, the DDS is configured to integrate sensor and/or driving environment information from different resources to provide integrated sensor and/or driving environment information and pass the integrated sensor and/or driving environment information to a prediction module. In some embodiments, the DDS is configured to provide customized, on-demand, and dynamic IRT functions to individual CAVs for sensing, transportation behavior prediction and management, planning and decision-making, and/or vehicle control. In some embodiments, sensing comprises providing information in real-time, short-term, and/or long-term for transportation behavior prediction and management, planning and decision-making, and/or vehicle control. In some embodiments, the DDS is configured to provide system security and backup, vehicle performance optimization, computing and management, and dynamic utility management for a CAV. In some embodiments, the DDS is configured to provide customized, on-demand, and dynamic IRT sensing functions for automated driving of a CAV using information obtained from the CAV and/or other CAVs and/or information obtained from the IRT. In some embodiments, the DDS is configured to provide customized, on-demand, and dynamic IRT transportation behavior prediction and management functions for automated driving of a CAV, wherein the transportation behavior prediction and management functions predict the behavior of surrounding vehicles, pedestrians, bicycles, and other moving objects.

In some embodiments, the transportation behavior prediction and management functions provide prediction support comprising providing raw data and/or providing features extracted from raw data; and/or a prediction result, wherein prediction support and/or a prediction result is/are provided to a CAV based on the prediction requirements of the CAV. In some embodiments, the DDS is configured to provide customized, on-demand, and dynamic IRT planning and decision-making functions for automated driving of a CAV. In some embodiments, the planning and decision-making functions provide path planning comprising identifying and/or providing a detailed driving path at a microscopic level for automated driving of a CAV; route planning comprising identifying and/or providing a route for automated driving of a CAV; special condition planning comprising identifying and/or providing a detailed driving path at a microscopic level and/or a route for automated driving of a CAV during special weather conditions or event conditions; and/or disaster solutions comprising identifying and/or providing a detailed driving path at a microscopic level and/or a route for automated driving of a CAV during a disaster, wherein path planning, route planning, special condition planning, and/or disaster solutions is/are provided to a CAV based on the planning and decision-making requirements of the CAV.

In some embodiments, the DDS comprises a control module and a decision-making module. In some embodiments, the DDS is configured to provide customized, on-demand, and dynamic IRT vehicle control functions for automated driving of a CAV. In some embodiments, the vehicle control functions are supported by customized, on-demand, and dynamic IRT sensing functions; customized, on-demand, and dynamic IRT transportation behavior prediction and management functions; and/or customized, on-demand, and dynamic IRT planning and decision-making functions. In some embodiments, vehicle control functions provide lateral control, vertical control, platoon control, fleet management, and system failure safety measures for a CAV. In some embodiments, system failure safety measures are configured to provide sufficient response time for drivers to assume control of a vehicle during system failure and/or to stop vehicles safely. In some embodiments, the vehicle control functions are configured to determine the computation resources supporting automated driving of a CAV and request and/or provide supplemental computation resources from the IRT. In some embodiments, the control module is configured to integrate and/or process information provided by the decision-making module and to send vehicle control commands to CAVs for automated driving of the CAVs.

In some embodiments, the DDS is configured to determine an optimal vehicle power consumption and driver comfort for an individual CAV to minimize power consumption and emissions and send the optimal vehicle power consumption and driver comfort to the CAV using the communications media.

In some embodiments, the IRT comprises hardware modules, the hardware modules comprising a sensing module comprising sensors, a communications module, and/or a computation module. In some embodiments, the IRT comprises software modules, the software modules comprising sensing software configured to use information from a sensing module to provide object detection and mapping; and decision-making software configured to provide paths, routes, and/or control instructions for CAVs.

In some embodiments, DDS is configured to provide system backup and redundancy services for individual CAVs, wherein the provide system backup and redundancy services provide backup and/or supplemental sensing devices for individual CAVs requiring sensing support; and/or backup and/or supplemental computational resources for individual CAVs to maintain CAV performance levels. In some embodiments, the DDS is configured to provide system backup and redundancy services for individual CAVs using the communications media. In some embodiments, the DDS is configured to collect sensor data describing the environment of a CAV; and provide at least a subset of the sensor data to a CAV to supplement a malfunctioning and/or deficient sensor system of the CAV to maximize proper functioning of the CAV. In some embodiments, the sensor data is provided by an IRT sensing module. In some embodiments, the sensor data and the at least a subset of the sensor data are communicated between the DDS and the CAV over the communications medium. In some embodiments, the sensor data comprises information describing road conditions, traffic signs and/or signals, and objects surrounding the CAV. In some embodiments, the DDS is further configured to integrate the data; provide the data to a prediction, planning, and decision-making system; store the data; and/or retrieve the at least a subset of data.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A Device Allocation System (DAS) of a Distributed Driving System (DDS), the DDS comprising:
   a) a plurality of connected and automated vehicles (CAV), each CAV comprising a vehicle onboard system configured to generate control instructions for automated driving of the CAV;
   b) an intelligent roadside toolbox (IRT), wherein the IRT provides customized, on-demand, and dynamic IRT functions to the plurality of CAV for dynamic utility management (DUM); and
   c) a communications medium for transmitting data between the plurality of CAV and the IRT; and
   the DAS comprising:
   a) a module to input a preference and/or a goal from a DDS service provider;
   b) a component to produce a multi-objective optimization function to optimize system reliability, system intelligence, system efficiency, and/or system resilience;
   c) a module to select a resource allocation service from a DDS; and
   d) a module to allocate resources among IRT devices and CAV devices,
   wherein the resources comprise intelligence, communications capacity, and at least one or more of automated driving functions and/or power;
   wherein the customized, on-demand, and dynamic IRT functions comprise dynamic utility management; sensing services; transportation prediction and management services at a macroscopic level, mesoscopic level, and microscopic level; planning and decision-making services at a macroscopic level, mesoscopic level, and microscopic level; and at least one of vehicle control services; system security and backup services; computing and management services; vehicle performance optimization services; and/or information provision services;

wherein dynamic utility management is provided by a DUM software module configured to optimize use of resources by the plurality of CAV at more than one vehicle intelligence level by assembling IRT functions provided to the plurality of CAV and balancing CAV onboard system costs;

wherein the IRT devices comprise a Roadside Unit (RSU);

wherein the RSU comprises a sensing module, a communication module, a data processing module, an interface module, and an adaptive power supply module;

wherein:
- the sensing module is configured to detect the environment;
- the communication module is configured to communicate with the CAV, traffic control units (TCUs), and a cloud;
- the data processing module is configured to process data from the sensing and/or the communication module;
- the interface module is configured to communicate data between the data processing module and the communication module; and
- the adaptive power supply module is configured to adjust power delivery according to conditions of a local power grid with backup redundancy;

wherein the RSU further comprises a data fusion module, a prediction module, a planning module, a decision making module, and a control method computation module;

wherein:
- the data fusion module fuses the data from sources comprising CAV sensors, roadside sensors, and the cloud;
- the prediction module conducts prediction based on learning, statistical, and empirical algorithms;
- the planning module conducts macroscopic level planning, mesoscopic level planning, and microscopic level planning;
- the decision making module produces vehicle control instructions, and
- the control method computation module produces input for the data fusion module.

2. The DAS of claim 1, configured to dynamically allocate resources to the CAV devices and/or to the IRT devices based on time, location, IRT conditions, and/or environmental factors.

3. The DAS of claim 1, wherein the DAS is provided as a subsystem of a DDS.

4. The DAS of claim 1, wherein the DDS provides intelligence for a plurality of vehicles at an automated driving level of level 0, level 1, level 2, level 3, and/or level 4.

5. The DAS of claim 1, wherein the DDS manages CAV on roads with a partially instrumented IRT, wherein coverage of the roads by the IRT is provided at critical points on the roads.

6. The DAS of claim 1, wherein the DDS controls the automated driving of CAV and manages the combined functionality of CAV and IRT to provide an appropriate system intelligence level for CAV control.

7. The DAS of claim 1, wherein the DAS allocates resources to CAV and the IRT to provide an appropriate system intelligence level for CAV control.

8. The DAS of claim 1, wherein the IRT devices comprise roadside units (RSU).

9. The DAS of claim 1, wherein the IRT devices comprise a component of a connected and automated vehicle highway (CAVH) system infrastructure or comprise a component of an intelligent roadside infrastructure system (IRIS) infrastructure.

10. The DAS of claim 1, wherein the CAV devices comprise a vehicle control unit (VCU) or an onboard unit (OBU).

11. The DAS of claim 1, configured to:
- improve safety and efficiency of the DDS;
- provide and/or improve intelligence, efficiency, reliability, and/or resilience of DDS; and/or
- communicate with an automated vehicle services provider.

12. The DAS of claim 1, wherein:
- the IRT devices are physical devices and/or virtual devices and comprise hardware and/or software for communication; and/or
- the CAV devices are physical devices and/or virtual devices and comprise hardware and/or software for communication.

13. The DAS of claim 1, wherein the IRT devices and/or the CAV devices comprise hardware and/or software resources used by the CAV and the IRT; and wherein the IRT devices support and/or provide automated driving functions for CAV.

14. The DAS of claim 1, wherein the automated driving functions comprise sensing functions, transportation behavior prediction and management functions, planning and decision-making functions, and/or vehicle control functions.

15. The DAS of claim 14, wherein the vehicle control instructions comprise customized, detailed, and time-sensitive vehicle control instructions for an individual vehicle.

16. The DAS of claim 1, wherein the resources provide sensing, transportation behavior prediction and management, planning and decision making, and/or vehicle control.

17. The DAS of claim 1, configured to perform methods to optimize profits for service providers; and/or configured to perform methods to optimize benefits for individual users.

18. A method comprising using the system of claim 1 to allocate resources among IRT devices and CAV devices.

* * * * *